US008666442B2

(12) United States Patent
Jeong (10) Patent No.: US 8,666,442 B2
(45) Date of Patent: Mar. 4, 2014

(54) METHOD AND APPARATUS FOR CONTROLLING UPLINK POWER IN WIRELESS COMMUNICATION SYSTEM

(75) Inventor: Su-Ryong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 13/194,797

(22) Filed: Jul. 29, 2011

(65) Prior Publication Data

US 2012/0028673 A1 Feb. 2, 2012

(30) Foreign Application Priority Data

Jul. 29, 2010 (KR) .................. 10-2010-0073265

(51) Int. Cl.
*H04B 7/00* (2006.01)
*H04W 36/00* (2009.01)

(52) U.S. Cl.
USPC ........... 455/522; 455/444; 455/443; 455/449; 455/69

(58) Field of Classification Search
USPC ........... 455/424, 426.1, 435.2, 436–444, 449, 455/450, 522, 67.11, 68–70, 115.3, 126, 455/127.1, 127.2, 135, 226.3, 277.2, 296; 370/318, 328
See application file for complete search history.

(56) References Cited

U.S. PATENT DOCUMENTS

| | | | | |
|---|---|---|---|---|
| 6,473,624 | B1 * | 10/2002 | Corbett et al. ................ | 455/522 |
| 7,680,080 | B2 * | 3/2010 | Zeira et al. .................... | 370/332 |
| 2009/0253461 | A1 * | 10/2009 | Kuwahara ...................... | 455/561 |
| 2009/0279519 | A1 * | 11/2009 | Brisebois et al. ............. | 370/338 |
| 2010/0061476 | A1 * | 3/2010 | Kim et al. ...................... | 375/265 |
| 2010/0085913 | A1 * | 4/2010 | Subrahmanya ............... | 370/328 |
| 2010/0110983 | A1 * | 5/2010 | Fu .................................. | 370/328 |
| 2010/0136996 | A1 * | 6/2010 | Han et al. ................... | 455/452.1 |
| 2010/0222068 | A1 * | 9/2010 | Gaal et al. ..................... | 455/450 |
| 2010/0246440 | A1 * | 9/2010 | Catovic ......................... | 370/254 |
| 2010/0315967 | A1 * | 12/2010 | Patel et al. .................... | 370/252 |
| 2011/0003559 | A1 * | 1/2011 | Morita et al. ............... | 455/67.14 |
| 2011/0009140 | A1 * | 1/2011 | Hwang et al. ................ | 455/509 |
| 2011/0103347 | A1 * | 5/2011 | Dimou .......................... | 370/331 |
| 2011/0141959 | A1 * | 6/2011 | Damnjanovic et al. ....... | 370/311 |
| 2011/0182239 | A1 * | 7/2011 | Aoyagi ......................... | 370/328 |
| 2011/0275363 | A1 * | 11/2011 | Kwon et al. ................ | 455/422.1 |
| 2012/0046063 | A1 * | 2/2012 | Chande et al. ................ | 455/522 |
| 2012/0244864 | A1 * | 9/2012 | Fujii ............................. | 455/436 |
| 2013/0084858 | A1 * | 4/2013 | Ramasamy et al. .......... | 455/434 |

* cited by examiner

*Primary Examiner* — Dominic E Rego (57) ABSTRACT

A method is provided for controlling an uplink (UL) power by a Mobile Station (MS) in a wireless communication system including an upper-layer Base Station (BS) and a lower-layer BS whose cell coverage is narrower than that of the upper-layer BS. The method also includes measuring a first received signal strength indicating a received signal strength of a first reference signal received from the upper-layer BS, and a second received signal strength indicating a received signal strength of a second reference signal received from the lower-layer BS, acquiring a transmission (TX) power ratio representative of a ratio of a first TX power indicating a TX power of the upper-layer BS to a second TX power indicating a TX power of the lower-layer BS, selecting a first serving BS indicating a UL serving BS to which the MS will transmit a UL signal, from among the upper-layer BS and the lower-layer BS, and determining a UL TX power, based on the first received signal strength, the second received signal strength, and the TX power ratio, and transmitting the UL signal to the first serving BS using the UL TX power.

26 Claims, 7 Drawing Sheets

METHOD AND APPARATUS FOR CONTROLLING UPLINK POWER IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jul. 29, 2010 and assigned Serial No. 10-2010-0073265, the entire disclosure of which is hereby incorporated by reference.

TECHNICAL FIELD OF THE INVENTION

The present disclosure relates to wireless communication systems, and more particularly, to a method and apparatus for controlling uplink power in a wireless communication system.

BACKGROUND OF THE INVENTION

Due to the demand for data communication and the increase in various communication services in wireless communication systems, there is a growing need to increase the transmission capacity of these wireless communication systems. To this end, technology for heterogeneous networks has been studied. The term 'heterogeneous network' may refer to a communication system in which cells having different phases, cell coverages and characteristics are operating in a mixed way.

A configuration of a conventional heterogeneous network will be described below with reference to FIG. 1.

Figure 1:
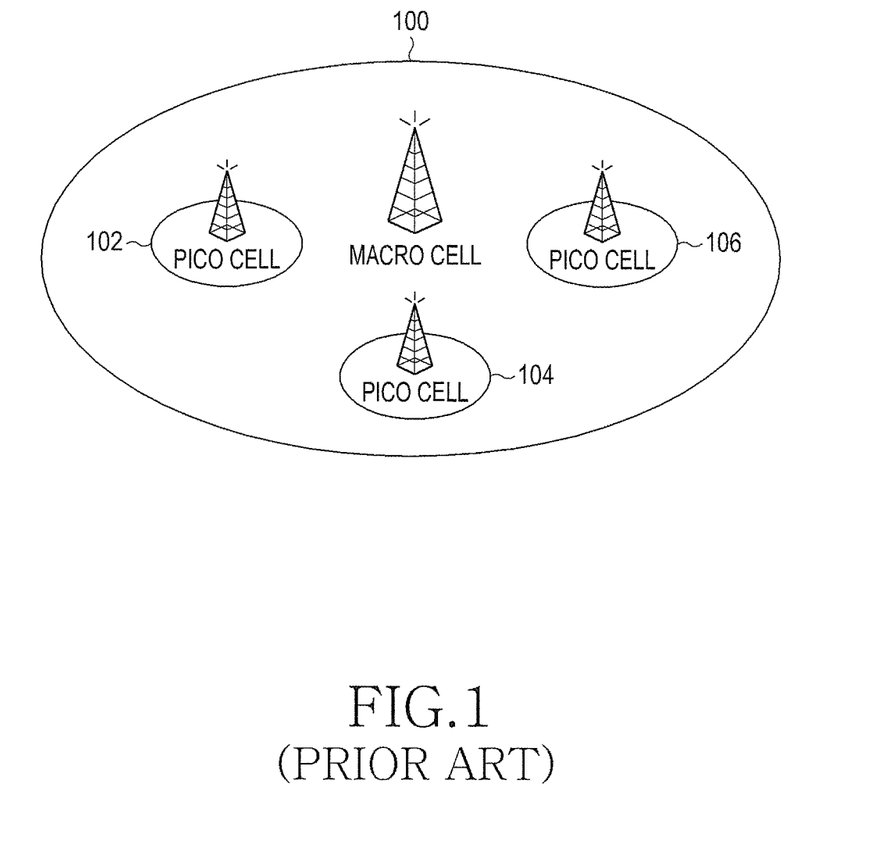
FIG. 1 is a diagram illustrating an example of a configuration of a conventional heterogeneous network.

FIG. 1 illustrates an example of a configuration of a conventional heterogeneous network. The heterogeneous network has a plurality of pico cells 102 to 106 additionally included in a cellular network 100 of a conventional macro cell. Although not illustrated, the cellular network 100 of the macro cell may include femto cells in addition to the pico cells.

This heterogeneous network may increase not only the overall transmission capacity of the system but also the transmission capacity in additional cells such as pico cells and femto cells, making it possible to provide additional services.

For the cells included in the heterogeneous network, different cell coverage sizes may be established depending on the purposes and environments of the cells, and/or because Base Stations (BSs) of the different cells may have different transmission (TX) powers. Inter-cell interference may occur between cells having different cell coverage sizes because their cell operating areas may overlap.

Inter-cell uplink (UL) interference in a conventional heterogeneous network will be described below with reference to FIG. 2.

Figure 2:
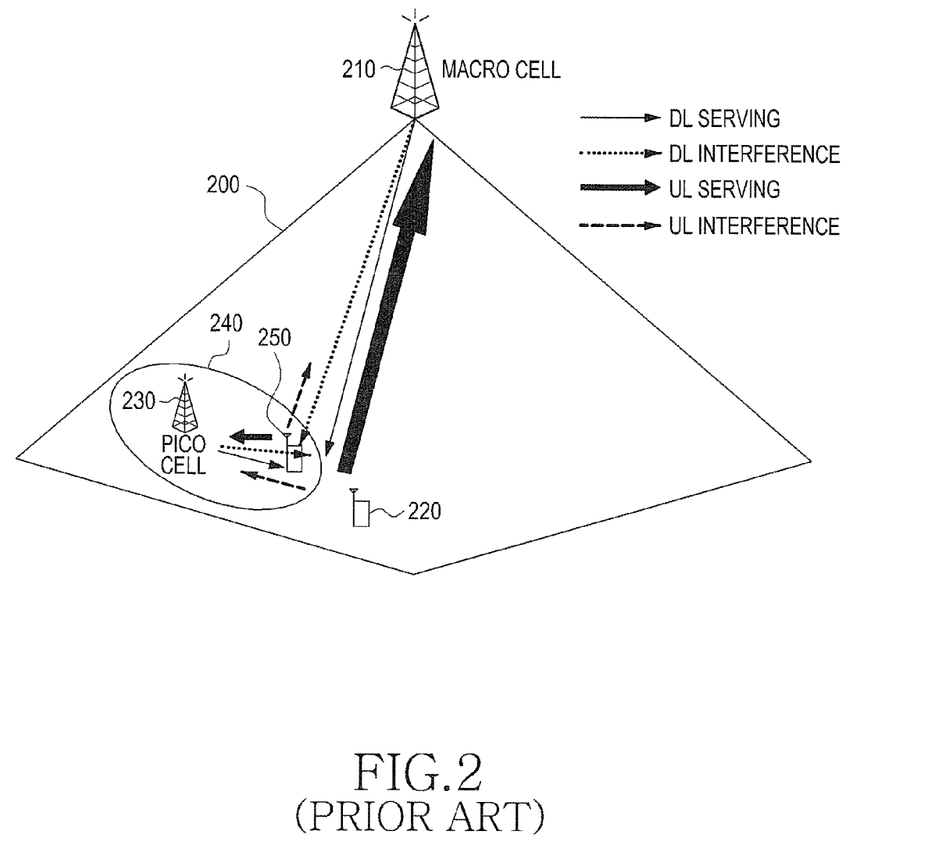
FIG. 2 illustrates example UL interference of a macro mobile station (MS) to a pico cell in a conventional heterogeneous network.

FIG. 2 illustrates UL interference of a macro Mobile Station (MS) to a pico cell in a conventional heterogeneous network. It is assumed that in a heterogeneous network with one pico cell 240 included in a macro cell 200, a macro mobile station (MS) 220 in the macro cell 200 communicates with a macro base station (BS) 210 and a pico MS 250 in the pico cell 240 communicates with a pico BS 230.

The pico MS 250 may be influenced by significant interference from the macro MS 220, which is located relatively closer to the pico BS 230 than the macro BS 210, when the macro MS 220 transmits uplink (UL) signals. A common power control equation may be defined as, $$P_{TX} = L + NI + SINR_{Target} \qquad (1)$$

Equation (1) represents a common UL power control equation. In Equation (1), $P_{TX}$ represents UL transmit (TX) power, L represents a path loss, NI represents Noise and Interference (NI), and $SINR_{target}$ represents a target received Signal to Interference and Noise Ratio (SINR). As shown in Equation (1), conventionally, the UL TX power is determined by compensating for the path loss and the NI (or the amount of interference) in addition to the target received SINR.

The macro MS 220 located far from the macro BS 210 may have a large path loss that should be compensated for. Thus, the pico BS 230, which is located relatively closer to the macro MS 220, may undergo interference by UL signals that the macro MS 220 transmits with power higher than that of UL signals transmitted by the pico MS 250. Therefore, an effective method for reducing inter-cell interference due to TX power of UL signals in a heterogeneous network should be taken into consideration.

SUMMARY OF THE INVENTION

To address the above-discussed deficiencies of the prior art, it is a primary object to provide a method and apparatus for controlling an uplink (UL) power in a wireless communication system.

Another aspect of an embodiment of the present disclosure provides a method and apparatus for determining a serving base station (BS) for each of a UL and a downlink (DL) in a wireless communication system configured as a heterogeneous network.

Another aspect of an embodiment of the present disclosure provides a power control method and apparatus for minimizing or otherwise reducing inter-cell UL interference in a wireless communication system configured as a heterogeneous network.

In accordance with one embodiment of the present disclosure, there is provided a method for controlling an uplink (UL) power by a Mobile Station (MS) in a wireless communication system including an upper-layer BS and a lower-layer BS whose cell coverage is narrower than that of the upper-layer BS. The method includes measuring a first received signal strength indicating a received signal strength of a first reference signal received from the upper-layer BS, and a second received signal strength indicating a received signal strength of a second reference signal received from the lower-layer BS, acquiring a transmission (TX) power ratio representative of a ratio of a first TX power indicating a TX power of the upper-layer BS to a second TX power indicating a TX power of the lower-layer BS, selecting a first serving BS indicating a UL serving BS to which the MS will transmit a UL signal from among the upper-layer BS and the lower-layer BS, determining a UL TX power, based on the first received signal strength, the second received signal strength, and the TX power ratio, and transmitting the UL signal to the first serving BS using the UL TX power.

In accordance with another embodiment of the present disclosure, there is provided a method for controlling an uplink (UL) power by a Base Station (BS) in a wireless communication system. The method includes transmitting a reference signal to a MS; transmitting, to the MS, one of a TX power of the BS and a TX power ratio representative of a ratio of a TX power of an upper-layer BS to a TX power of a lower-layer BS, and receiving a UL signal from the MS. The BS may be one of the upper-layer BS and the lower-layer BS whose cell coverage is narrower than that of the upper-layer BS, and the UL TX power may be determined based on a received signal strength of the reference signal and the TX power ratio.

In accordance with another embodiment of the present disclosure, there is provided an apparatus for controlling an uplink (UL) power in a Mobile Station (MS) in a wireless communication system including an upper-layer Base Station (BS) and a lower-layer BS whose cell coverage is narrower than that of the upper-layer BS. The apparatus includes a receiver for receiving a first reference signal from the upper-layer BS and receiving a second reference signal from the lower-layer BS, a memory for storing a first received signal strength indicating a received signal strength of the first reference signal, a second received signal strength indicating a received signal strength of the second reference signal, and a transmission (TX) power ratio. The apparatus also includes a controller for measuring the first received signal strength and the second received signal strength, acquiring the TX power ratio representative of a ratio of a first TX power of the upper-layer BS to a second TX power of the lower-layer BS, and selecting a first serving BS indicating a UL serving BS to which the MS will transmit a UL signal, from among the upper-layer BS and the lower-layer BS, and determining a UL TX power, based on the first received signal strength, the second received signal strength, and the TX power ratio. The apparatus further includes a transmitter for transmitting the UL signal to the first serving BS using the UL TX power.

In accordance with yet another embodiment of the present disclosure, there is provided an apparatus for controlling an uplink (UL) power in a Base Station (BS) in a wireless communication system. The apparatus includes a transmitter for transmitting a reference signal to a Mobile Station (MS), and transmitting, to the MS, one of a transmission (TX) power of the BS and a TX power ratio representative of a ratio of a TX power of an upper-layer BS to a TX power of a lower-layer BS. The apparatus also includes a memory for storing the TX power of the BS and the TX power ratio, and a receiver for receiving a UL signal that is transmitted from the MS using the UL TX power. The BS may be one of the upper-layer BS and the lower-layer BS whose cell coverage is narrower than that of the upper-layer BS. Also the UL TX power may be determined based on a received signal strength of the reference signal and the TX power ratio.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems. In the following description, specific details such as detailed configuration and components are merely provided to assist the overall understanding of exemplary embodiments of the present disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

The present disclosure provides a method and apparatus for controlling uplink (UL) power in a wireless communication system configured as a heterogeneous network. Specifically, the present disclosure provides a UL power control method and apparatus for controlling inter-cell interference for each cell in a wireless cellular environment where pico cells, femto cells, and macro cells coexist.

A cellular network for a relatively broad area, such as a macro cell, will be referred to as a 'macro cell', and a cell for a narrower area than that of the cellular network, such as pico cells and femto cells, will be referred to as a 'pico cell'. Although the terms 'macro cell' and 'pico cell' will be used within this disclosure, they shall be construed to include a cell for a relatively broader layer (or upper area) and a cell for a relatively narrower layer (or lower area) in a heterogeneous network, respectively. In the following description of the present disclosure, it should noted that the terms 'cell' and 'BS' will be used in the same meaning.

In a wireless communication system, a heterogeneous network may be used to increase the transmission capacity. However, interference to UL signals in a pico cell may increase due to a macro MS, which is located relatively closer to the pico cell than a macro cell, which may reduce the transmission performance of UL signals in the pico cell.

To solve these and other problems of the heterogeneous network, the present disclosure provides a method for allowing a pico cell to have different cell coverages for a UL signal and a downlink (DL) signal, unlike the conventional technology for allowing a pico cell to have the same cell coverage for both a UL signal and a DL signal.

Figure 3A:
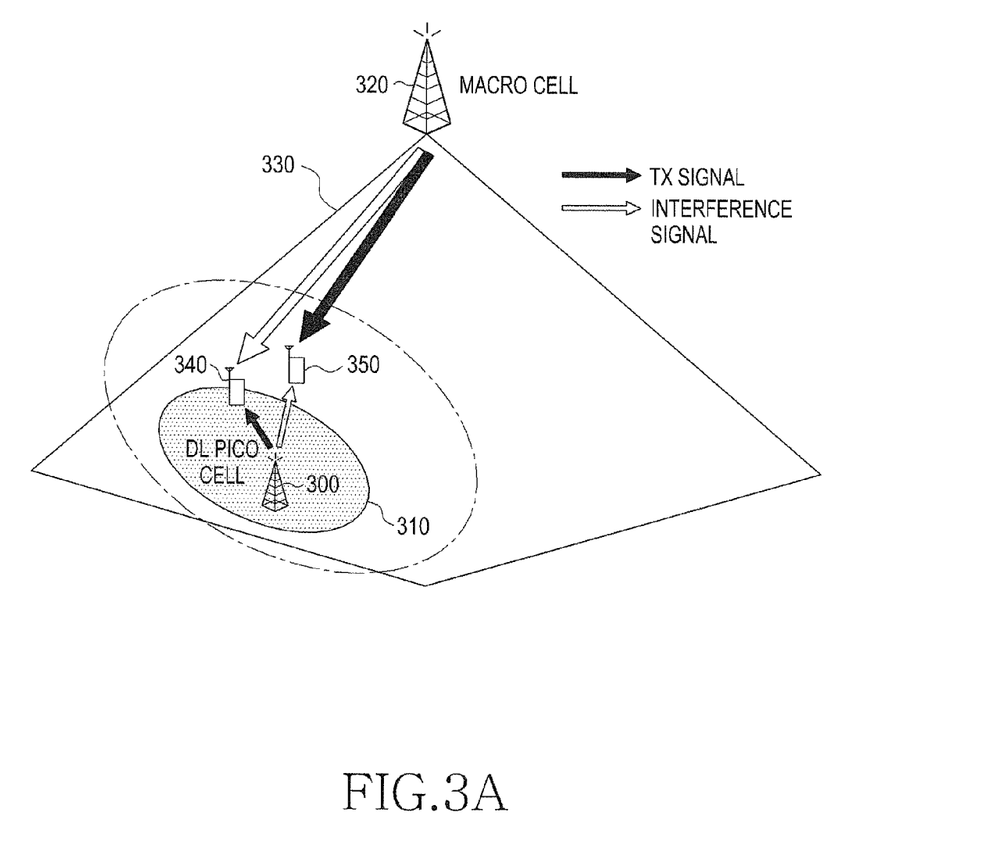
FIG. 3A illustrates an example cell coverage of a pico cell by a downlink (DL) signal in a wireless communication system according to this disclosure.

FIG. 3A illustrates an example cell coverage of a pico cell by a DL signal in a wireless communication system according to this disclosure, that the wireless communication system includes a heterogeneous network having one pico cell 310 included in a macro cell 330. In this case, a macro mobile station (MS) 350 in the macro cell 330 communicates with a macro base station (BS) 320, and a pico MS 340 in the pico cell 310 communicates with a pico BS 300.

The pico cell 310 has smaller cell coverage than that of the macro cell 330, because the pico BS 300 uses lower transmission (TX) power than that of the macro BS 320. Therefore, a transmission distance for a DL signal from the pico BS 300 is shorter than a transmission distance for a DL signal from the macro BS 320.

Figure 3B:
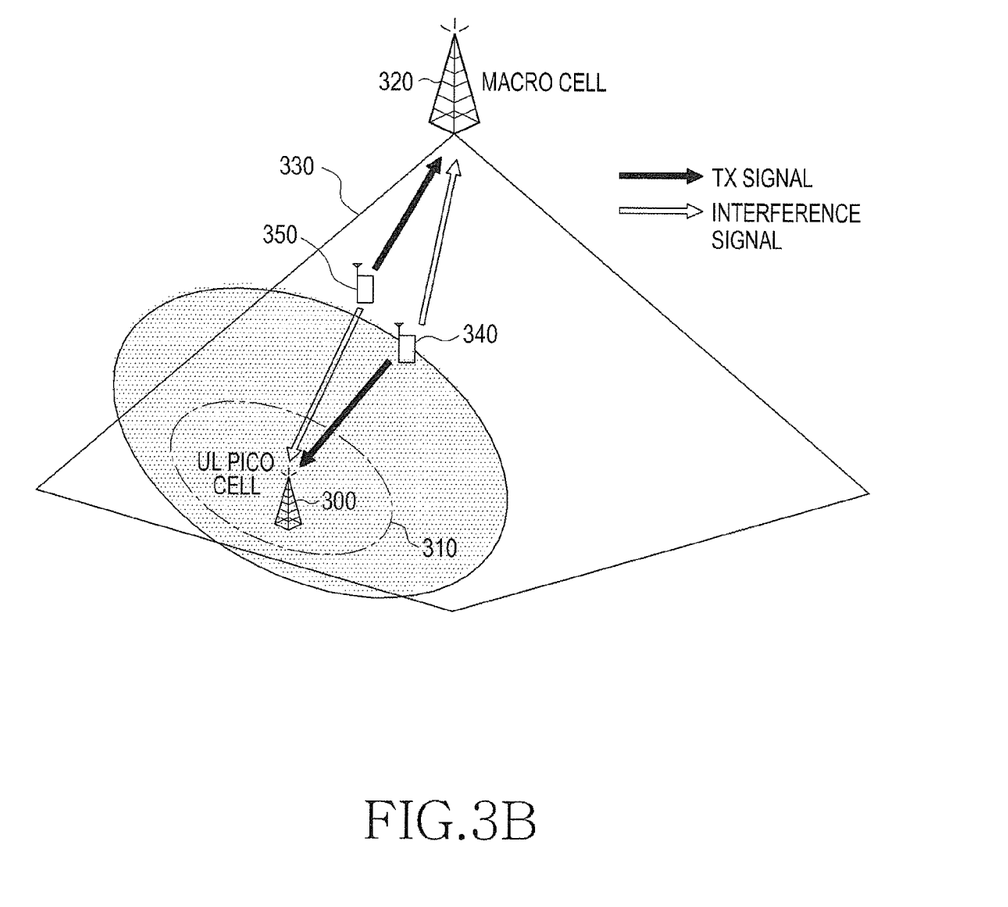
FIG. 3B illustrates an example cell coverage of a pico cell by an uplink (UL) signal in a wireless communication system according to this disclosure.

FIG. 3B illustrates an example cell coverage of a pico cell by a UL signal in a wireless communication system according to this disclosure, in which the wireless communication system is configured to be the same as that in FIG. 3A. The pico MS 340 transmits a UL signal to the pico BS 300 using the same TX power as that of the macro MS 350. Therefore, a transmission distance for a UL signal from the pico MS 340 is the same as a transmission distance for a UL signal from the macro MS 350.

A below-described embodiment of the present invention provides a power control method and apparatus for suppressing inter-cell interference in a wireless communication system configured as a heterogeneous network (hereinafter, the wireless communication system will be referred to as a 'heterogeneous network'), on the assumption that as illustrated in FIGS. 3A and 3B, a cell coverage of a pico cell by a UL signal may be different from a cell coverage of the pico cell by a DL signal (i.e., a transmission distance for a UL signal is different from a transmission distance for a UL signal in a pico cell).

The proposed power control method in a heterogeneous network will now be described.

Each of a macro BS and a pico BS transmits its preamble signal for cell selection and synchronization and a superframe header or a frame header including control information to an MS in a DL signal. The preamble signals from the macro BS and the pico BS are separated from each other in a frequency domain or a time domain during their transmission. In other words, the preamble signals of the macro BS and the pico BS may be transmitted using different frequency bands, or transmitted at different times.

Therefore, the MS may measure signal strengths (i.e., Signal to Interference Ratio (SIR) or Signal to Interference and Noise Ratio (SINR)) for the signals received from the macro BS and the pico BS. For convenience of description, it will be assumed herein that the MS measures an SIR.

If the MS cannot measure an SIR based on a preamble signal, each of the macro BS and the pico BS may transmit a midamble signal or a pilot signal existing in a frame, instead of the preamble signal. Even in this case, the midamble signals or pilot signals from the macro BS and the pico BS are separated from each other in a frequency domain or a time domain during their transmission. Therefore, the MS may measure SIRs from the macro BS and the pico BS individually.

In this way, an MS may measure SIRs for a macro cell and a pico cell included in the same cell in exclusively separated frequency or time domains. Therefore, when measuring an SIR for a macro cell, the MS may experience reduced interference from a pico cell in the same cell, and when measuring an SIR for a pico cell, the MS may experience reduced interference from a macro cell in the same cell.

As a result, when measuring SIRs for a macro cell and a pico cell, the MS may only consider interference from an outer cell, while being relatively immune to interference from the same cell. Hence, measured SIRs for a macro cell and a pico cell, which are measured by the MS, may be defined as Equations (2) and (3) below, respectively.

$$SIR_{Macro\_to\_outercell} = \frac{P_{TX\_Macro} P_{Loss\_Macro}}{\sum P_{TX\_outercell} P_{Loss\_outercell}} \quad (2)$$

where $SIR_{Macro\_to\_outercell}$ represents a ratio of a signal from a macro cell to interference from an outer cell, which is measured by an MS, $P_{TX\_Macro}$ represents a TX power of a macro cell, $P_{Loss\_Macro}$ represents a path loss from a macro cell to an MS, $P_{TX\_outercell}$ represents a TX power from each of outer cells, and $P_{Loss\_outercell}$ represents a path loss from each of outer cells to an MS.

$$SIR_{Pico\_to\_outercell} = \frac{P_{TX\_Pico} P_{Loss\_Pico}}{\sum P_{TX\_outercell} P_{Loss\_outercell}} \quad (3)$$

where $SIR_{Pico\_to\_outercell}$ represents a ratio of a signal from a pico cell to interference from an outer cell, which is measured by an MS, $P_{TX\_Pico}$ represents a TX power of a pico cell, and $P_{Loss\_Pico}$ represents a path loss from a pico cell to an MS.

The MS first selects a serving BS from which it will receive DL signals, based on the SIRs for a macro cell and a pico cell, which are determined in accordance with Equations (2) and (3). Specifically, the MS may determine a DL serving BS using Equation (4) below.

$SIR_{Macro\_to\_outercell} > SIR_{Pico\_to\_outercell}$ (macro cell serving)

$SIR_{Macro\_to\_outercell} < SIR_{Pico\_to\_outercell}$ (pico cell serving) (4)

The MS may also determine the DL serving BS based on the strength of a signal received in a DL from each of a macro cell and a pico cell, instead of the measured SIRs.

Each of the macro BS and the pico BS may transmit information about a difference between TX power of the macro BS and TX power of the pico BS, i.e., a TX power ratio, to the MS over a DL broadcast channel. On the other hand, the macro BS and the pico BS may transmit information about their TX powers to the MS. In this case, the MS may calculate a ratio of TX power of a macro BS to TX power of a pico BS using Equation (5) below.

$$P_{Gap} = P_{TX\_Macro}/P_{TX\_Pico} \quad (5)$$

where $P_{Gap}$ represents a ratio of TX power of a macro BS to TX power of a pico BS, $P_{TX\_Macro}$ represents a TX power in a macro BS, and $P_{TX\_Pico}$ represents a TX power in a pico BS.

Thereafter, the MS selects a serving BS to which it will transmit UL signals, using Equation (6) below.

$SIR_{Macro\_to\_outercell} > P_{Gap} SIR_{Pico\_to\_outercell}$ (macro cell serving)

$SIR_{Macro\_to\_outercell} < P_{Gap} SIR_{Pico\_to\_outercell}$ (pico cell serving) (6)

As in Equation (4) described above, a DL serving BS is selected based on the strength of received DL signals, measured by the MS. Thus, the DL serving BS may be selected based on measured SIRs, regardless of TX powers of the macro cell and the pico cell.

However, received signal strengths measured in a macro cell and a pico cell should be used to select a UL serving BS, so measured SIRs and a ratio of TX power of a macro cell to TX power of a pico cell should be considered by the MS as in Equation (6) above.

In this way, an MS may select a DL serving BS and a UL serving BS in accordance with Equations (4) and (6), respectively. Specifically, the MS may select a DL serving BS and a UL serving BS using the following Table 1 determined by Equations (4) and (6).

TABLE 1

| Conditions | DL serving BS | UL serving BS |
|---|---|---|
| $SIR_{Pico\_to\_outercell} > SIR_{Macro\_to\_outercell}$ | pico cell | pico cell |
| $SIR_{Pico\_to\_outercell} < SIR_{Macro\_to\_outercell} <$ $P_{Gap}SIR_{Pico\_to\_outercell}$ | macro cell | pico cell |
| $P_{Gap}SIR_{Pico\_to\_outercell} <$ $SIR_{Macro\_to\_outercell}$ | macro cell | macro cell |

Once a DL serving BS and a UL serving BS are selected, the MS determines a TX power for transmission of UL signals. A TX power determination method for a heterogeneous network according to an embodiment of the present disclosure will be described below.

In the improved UL power control method, for UL power control, a power control equation is used, which is based on a DL SINR $SINR_{DL}$ or a DL SIR $SIR_{DL}$, instead of the $SINR_{target}$ used in the power control equation of Equation (1). For example, the power control equation now used in the IEEE 802.16 WiMAX standard is as shown in Equation (7) below.

$$P(dBm) = L + SINR_{Target} + NI + Offset \quad (7)$$

$$SINR_{Target} =$$
$$10\log_{10}\left(\max\left(10^{\wedge}\left(\frac{SINR_{MIN}(dB)}{10}\right) \cdot \gamma_{IoT} \times SIR_{DL} - \alpha\right)\right) -$$
$$\beta \times 10\log 10(TNS)$$

where P(dbm) represents UL TX power, L represents a path loss, NI represents Noise and Interference (NI) or the amount of interference, $SINR_{target}$ represents a target received SINR, Offset represents a value used for additional power correction for TX power of an MS, and transmitted to from a BS to the MS over a control channel, $SINR_{MIN}$ represents the minimum SINR, which is transmitted from a BS to an MS over a broadcast channel so that the minimum expected SINR may be determined in the MS, $\gamma_{IoT}$ represents a control value used to enable a BS to adjust the entire UL interference and fairness between MSs in its cell, and delivered from the BS to MSs over a broadcast channel, α represents a value that is determined in a BS depending on the number of receive antennas, and β represents a value that is determined in a BS depending on the number of streams of a transmission signal. In this way, Offset, $SINR_{MIN}$, $\gamma_{IoT}$, α, and β are determined in a BS, or designated by the BS according to the characteristic of an MS and then notified to the MS, but are not determined by the MSs.

Therefore, an equation for controlling UL TX power of each MS may be defined as Equation (8) below.

$$P(dBm)=L+NI+Offset+f(SIR_{DL}) \quad (8)$$

where $SIR_{DL}$ represents a parameter that is differently determined for each MS, so it is represented in f( ). In Equation (8), $SIR_{DL}$ may be replaced by $SINR_{DL}$, $CINR_{DL}$, etc.

$SIR_{DL}$ in a homogeneous network may be defined as Equation (9) below.

$$SIR_{DL} = \frac{P_{TX\_serving}P_{Loss\_serving}}{\sum P_{TX\_outercell}P_{Loss\_outercell}} \quad (9)$$

where $P_{TX\_serving}$ represents a TX power of a serving BS, $P_{Loss\_serving}$ represents a path loss from a serving BS to an MS, $P_{TX\_outercell}$ represents a TX power from each of outer BSs, and $P_{Loss\_outercell}$ represents a path loss from each of outer BSs to an MS.

However, heterogeneous cells existing in the cell are not considered in Equation (9), and signals from the heterogeneous cells may serve as interference to signals in the cell. Therefore, Equation (9) may be rewritten as Equation (10), when heterogeneous cells are taken into consideration.

$$SIR_{DL} = \frac{P_{TX\_serving}P_{Loss\_serving}}{P_{TX\_innercell}P_{Loss\_innercell} + \sum P_{TX\_outercell}P_{Loss\_outercell}} \quad (10)$$

where $P_{TX\_innercell}$ represents a TX power of a heterogeneous BS in a cell, and $P_{Loss\_innercell}$ represents a path loss from a heterogeneous BS in a cell to an MS.

For a macro cell or an upper cell and a pico cell or a lower cell, Equation (10) may be rewritten as Equations (11) and (12) below, respectively.

$$SIR_{DL\_Macro} = \frac{P_{TX\_Macro}P_{Loss\_Macro}}{P_{TX\_Pico}P_{Loss\_Pico} + \sum P_{TX\_outercell}P_{Loss\_outercell}} \quad (11)$$

$$SIR_{DL\_Pico} = \frac{P_{TX\_Pico}P_{Loss\_Pico}}{P_{TX\_Macro}P_{Loss\_Macro} + \sum P_{TX\_outercell}P_{Loss\_outercell}} \quad (12)$$

where $P_{TX\_Macro}$ represents a TX power in a macro BS, $P_{Loss\_Macro}$ represents a path loss from a macro BS to an MS, $P_{TX\_Pico}$ represents a TX power in a pico BS, and $P_{Loss\_Pico}$ represents a path loss from a pico BS to an MS.

However, DL SIRs in Equations (11) and (12) are SIRs, which are received from a macro BS and a pico BS, and in which a power difference between heterogeneous BSs in a heterogeneous network is not reflected. Therefore, for UL power control, a ratio of TX power of a macro BS to TX power of a pico BS should be reflected in the SIRs for a macro BS and a pico BS, respectively. If the SIRs in Equations (11) and (12) are changed by reflecting the ratio of TX power of a macro BS to TX power of a pico BS, they may be rewritten as Equations (13) and (14), respectively.

$$SIR_{DL\_Macro}^{UL\_PC} = \frac{P_{TX\_Macro}P_{Loss\_Macro}}{P_{Gap}P_{TX\_Pico}P_{Loss\_Pico} + \sum P_{TX\_outercell}P_{Loss\_outercell}} \quad (13)$$

$$SIR_{DL\_Pico}^{UL\_PC} = \frac{P_{Gap}P_{TX\_Pico}P_{Loss\_Pico}}{P_{TX\_Macro}P_{Loss\_Macro} + \sum P_{TX\_outercell}P_{Loss\_outercell}} \quad (14)$$

Equations (13) and (14) represent SIRs determined by compensating for the power difference between a macro BS and a pico BS. However, the parameters used to calculate the SIRs written in Equations (13) and (14) may not be found all in the actual system. Therefore, in one embodiment, values of the parameters are acquired based on the values calculated in Equations (2) and (3) described above. Specifically, $P_{TX\_Macro}P_{Loss\_Macro}$ and $P_{TX\_Pico}P_{Loss\_Pico}$, which are used in Equations (13) and (14) based on Equations (2) and (3), are defined as Equation (15).

$$P_{TX\_Macro}P_{Loss\_Macro} = SIR_{Macro\_to\_outercell} \Sigma P_{TX\_outercell}P_{Loss\_outercell}$$

$$P_{PTX\_Pico}P_{Loss\_Pico} = SIR_{Pico\_to\_outercell} \Sigma P_{TX\_outercell}P_{Loss\_outercell} \quad (15)$$

Equations (13) and (14) re-modified based on Equation (15) may be given as Equations (16) and (17), respectively.

$$SIR_{DL\_Macro}^{UL\_PC} = \frac{SIR_{Macro\_to\_outercell} \sum P_{TX\_outercell}P_{Loss\_outercell}}{P_{Gap}SIR_{Pico\_to\_outercell}\sum P_{TX\_outercell}P_{Loss\_outercell} + \sum P_{TX\_outercell}P_{Loss\_outercell}} \quad (16)$$

$$= \frac{SIR_{Macro\_to\_outercell}}{P_{Gap}SIR_{Pico\_to\_outercell} + 1}$$

$$SIR_{DL\_Pico}^{UL\_PC} = \frac{P_{Gap}SIR_{Pico\_to\_outercell}\sum P_{TX\_outercell}P_{Loss\_outercell}}{SIR_{Macro\_to\_outercell}\sum P_{TX\_outercell}P_{Loss\_outercell} + \sum P_{TX\_outercell}P_{Loss\_outercell}} \quad (17)$$

$$= \frac{P_{Gap}SIR_{Pico\_to\_outercell}}{SIR_{Macro\_to\_outercell} + 1}$$

Therefore, the UL TX power control equation proposed by the present invention may be defined as Equations (18) and (19), which represent a UL TX power control equation used for UL signal transmission to a macro cell, and a UL TX power control equation used for UL signal transmission to a pico cell, respectively.

$$P_{TX\_Macro} = : L + NI + f(SIR_{DL\_Macro}^{UL\_PC}), \quad (18)$$

$$SIR_{DL\_Macro}^{UL\_PC} = \frac{SIR_{Macro\_to\_outercell}}{P_{Gap}SIR_{Pico\_to\_outercell}}$$

$$P_{TX\_Pico} = : L + NI + f(SIR_{DL\_Pico}^{UL\_PC}), \quad (19)$$

$$SIR_{DL\_Pico}^{UL\_PC} = \frac{P_{Gap}SIR_{Pico\_to\_outercell}}{SIR_{Macro\_to\_outercell} + 1}$$

Equations (18) and (19) are specific examples of UL TX power control equations, and they are applied to the IEEE 802.16m standard. By performing power control in accordance with Equations (18) and (19), the heterogeneous network may increase its transmission success rate while minimizing UL interference.

UL power control operations of a BS and an MS in a heterogeneous network will now be described.

Figure 4:
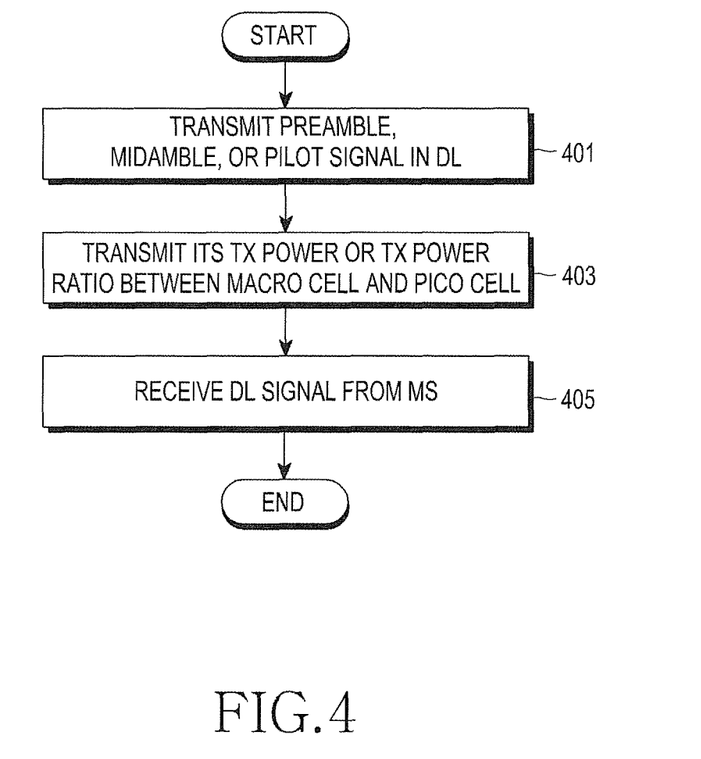
FIG. 4 illustrates an example base station (BS) operation for UL power control in a heterogeneous network according to this disclosure.

A BS operation will be described first with reference to FIG. 4. FIG. 4 illustrates a BS operation for UL power control in a heterogeneous network according to this disclosure. Although an operation of a macro BS will be described in FIG. 4, this operation may be performed by a pico BS rather than the macro BS.

In step 401, the macro BS transmits a preamble signal in a DL signal. The preamble signal transmitted from the macro BS may be transmitted in a frequency band different from that of a preamble signal transmitted from a pico BS, or may be transmitted in a time different from that of a preamble signal transmitted from the pico BS. In some embodiments, the macro BS may transmit a midamble signal or a pilot signal, instead of the preamble signal.

In step 403, the macro BS transmits, to an MS, its TX power or a ratio of TX power of a macro cell to TX power of a pico cell. In step 405, if a UL signal is transmitted from the MS after cell selection, the macro BS receives the UL signal.

An MS operation will now be described with reference to FIG. 5.

Figure 5:
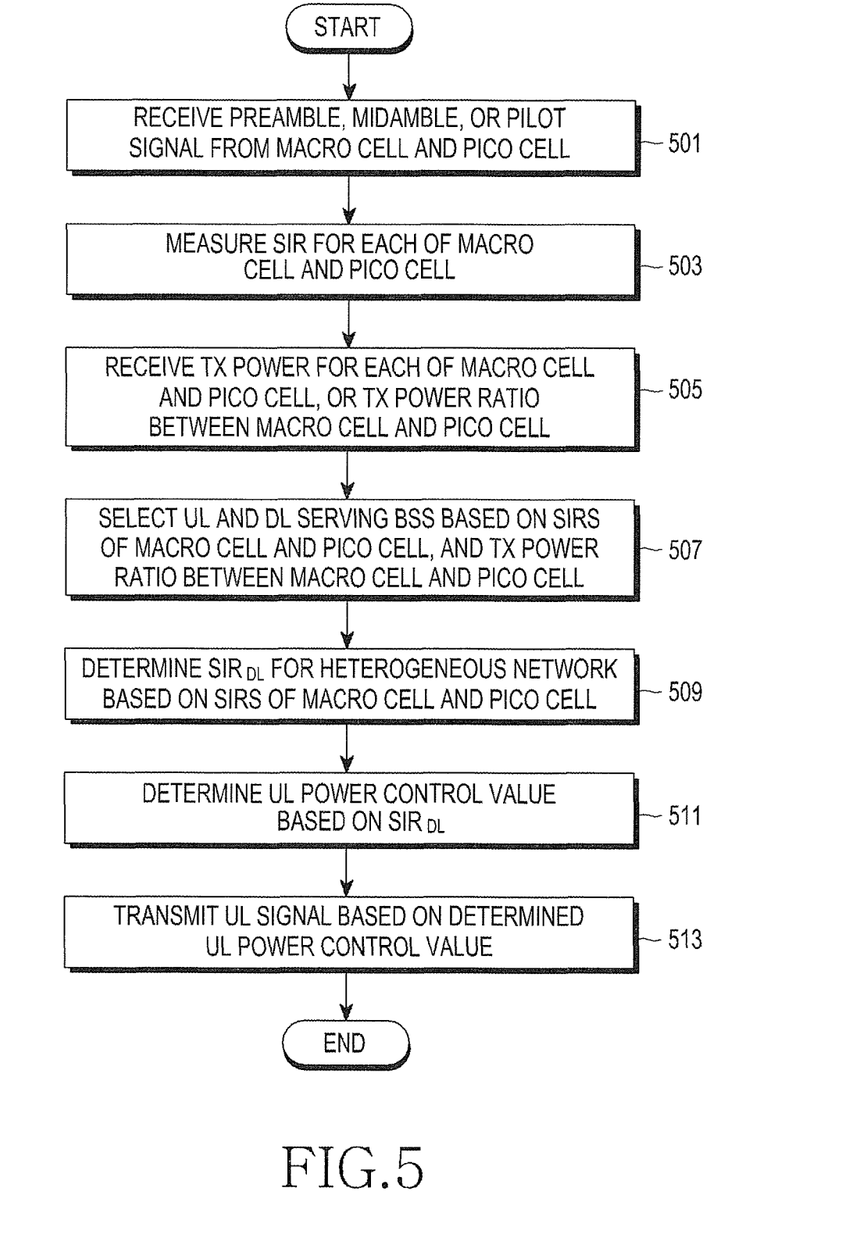
FIG. 5 illustrates an example MS operation for UL power control in a heterogeneous network according to this disclosure.

FIG. 5 illustrates an MS operation for UL power control in a heterogeneous network according to this disclosure. In step 501, the MS receives at least one of preamble signals, midamble signals, and pilot signals, which are transmitted in different frequency bands or different times from a macro cell and a pico cell. In step 503, the MS measures SIRs for the macro cell and the pico cell based on ones of the received preamble signals, midamble signals, and pilot signals.

In step 505, the MS receives TX power information of the macro cell and the pico cell from the macro cell and the pico cell, respectively, or receives information associated with a ratio of TX power of the macro cell to TX power of the pico cell from at least one of the macro BS and the pico BS. When receiving the TX power information of the macro cell and the pico cell, the MS calculates a ratio of TX power of the macro cell to TX power of the pico cell in accordance with Equation (5) described above.

In step 507, the MS selects UL and DL serving BSs based on the SIRs of the macro cell and the pico cell, and the ratio of TX power of the macro cell to TX power of the pico cell. In step 509, the MS determines $SIR_{DL}$ corresponding to the heterogeneous network based on the SIRs of the macro cell and the pico cell, and the ratio of TX power of the macro cell to TX power of the pico cell.

In step 511, the MS determines a UL power control value based on the determined $SIR_{DL}$. A method of determining the UL power control value has been described in conjunction with Equations (7) to (16). In step 513, the MS transmits a UL signal based on the determined UL power control value, completing the operation.

A structure of a BS according to an embodiment of the present invention will now be described with reference to FIG. 6.

Figure 6:
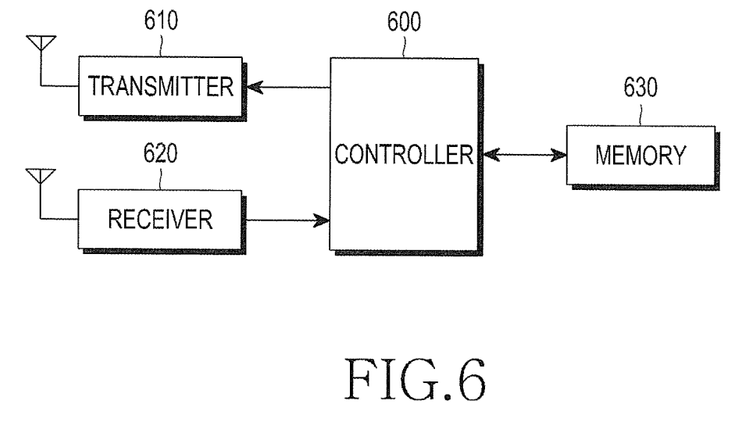
FIG. 6 illustrates and example BS according to this disclosure.

FIG. 6 illustrates an example block diagram of a BS according to this disclosure. Although a structure of a macro BS will be described in FIG. 6, a pico BS may also be configured to be similar to the macro BS.

The macro BS includes a controller 600, a transmitter 610, a receiver 620, and a memory 630.

The controller 600 controls overall operations of the transmitter 610, the receiver 620, and the memory 630.

The transmitter 610 transmits a preamble signal, a midamble signal, or a pilot signal to an MS in a DL signal. The transmitter 610 may transmit a TX power of the macro BS to the MS, or may transmit a ratio of TX power of a macro cell to TX power of a pico cell to the MS.

The receiver 620 receives a UL signal transmitted from the MS.

The memory 630 stores a TX power of the macro BS, a ratio of TX power of a macro cell to TX power of a pico cell, and information about a UL signal.

A structure of an MS according to an embodiment of the present invention will now be described with reference to FIG. 7.

Figure 7:
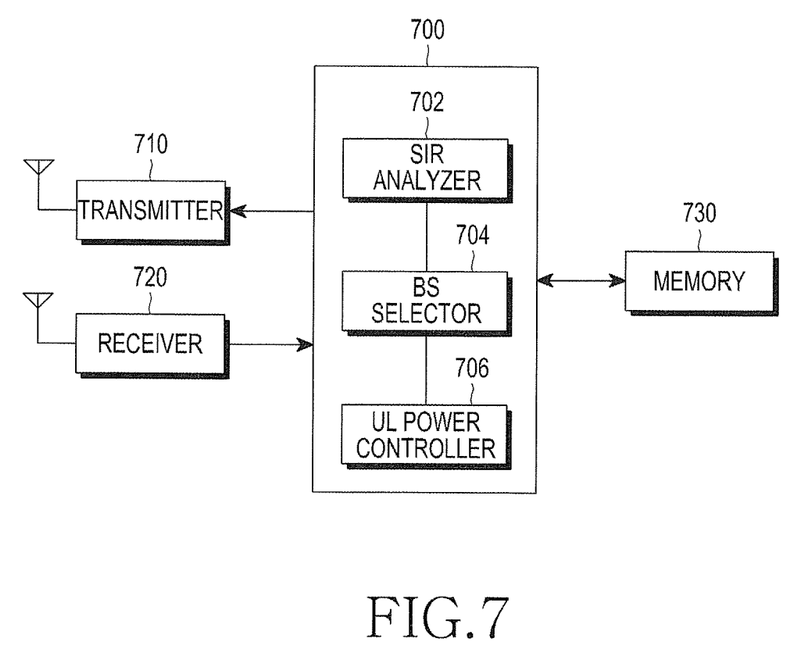
FIG. 7 illustrates an example MS according to this disclosure.

FIG. 7 illustrates an example block diagram of an MS according to this disclosure. The MS includes a controller 700, a transmitter 710, a receiver 720, and a memory 730.

The receiver 720 receives at least one of preamble signals, midamble signals, and pilot signals, which are transmitted in different frequency bands or different times from a macro cell and a pico cell. The receiver 720 receives TX powers of the macro cell and the pico cell from the macro cell and the pico cell, respectively, or receives a ratio of TX power of the macro cell to TX power of the pico cell from at least one of the macro BS and the pico BS.

The controller 700 controls overall operations of the transmitter 710, the receiver 720, and the memory 730, and includes an SIR analyzer 702, a BS selector 704, and a UL power controller 706.

The SIR analyzer 702 measures SIRs for the macro cell and the pico cell based on ones of the preamble signals, midamble signals, and pilot signals received from the macro cell and the pico cell.

The BS selector 704 selects UL and DL serving BSs based on the SIRs of the macro cell and the pico cell, and the ratio of TX power of the macro cell to TX power of the pico cell.

The UL power controller 706 determines SIRDL corresponding to the heterogeneous network based on the SIRs of the macro cell and the pico cell, and the ratio of TX power of the macro cell to TX power of the pica cell, and determines a UL power control value based on the determined SIRDL.

The transmitter 710 transmits a UL signal based on the UL power control value determined by the UL power controller 706.

The memory 730 stores the SIRs of the macro cell and the pico cell, and the ratio of TX power of the macro cell to TX power of the pico cell.

In this manner, embodiments of the present disclosure may prevent transmission performance of a pico cell from deteriorating due to UL interference of a macro MS located close to the pico cell in a heterogeneous network, which may minimize or reduce interference between heterogeneous BSs.

As is apparent from the foregoing description, in a wireless communication system configured as a heterogeneous network, the present disclosure may prevent transmission performance of a pico cell or a femto cell from deteriorating due to UL interference of a macro MS located close to the pico cell or the femto cell, thereby minimizing or reducing interference between heterogeneous BSs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling an uplink (UL) power by a Mobile Station (MS) in a wireless communication system including an upper-layer Base Station (BS) and a lower-layer BS whose cell coverage is narrower than that of the upper-layer BS, the method comprising:

measuring a first received signal strength of a first reference signal received from the upper-layer BS, and a second received signal strength of a second reference signal received from the lower-layer BS;

acquiring a transmission (TX) power ratio representative of a ratio of a first TX power of the upper-layer BS to a second TX power of the lower-layer BS;

selecting a UL serving BS to which the MS will transmit a UL signal, from among the upper-layer BS and the lower-layer BS, and determining a UL TX power, based on the first received signal strength, the second received signal strength, and the TX power ratio; and transmitting the UL signal to the UL serving BS using the UL TX power.

2. The method of claim 1, wherein each of the first and second reference signals includes one of a preamble signal, a midamble signal, and a pilot signal.

3. The method of claim 1, wherein the first and second reference signals are received in different frequency bands or at different times.

4. The method of claim 1, wherein the measuring of the first received signal strength and the second received signal strength, comprises measuring one of a Signal to Interference Ratio (SIR) and a Signal to Interference and Noise Ratio (SINR) for each of the first and second reference signals.

5. The method of claim 1, wherein the acquiring of the TX power ratio comprises:

receiving the first TX power from the upper-layer BS, and receiving the second TX power from the lower-layer BS; and acquiring of the TX power ratio by calculating the TX power ratio based on the first TX power and the second TX power.

6. The method of claim 1, wherein the TX power ratio is received from at least one of the upper-layer BS and the lower-layer BS.

7. The method of claim 1, further comprising selecting a downlink (DL) serving BS from which the MS will receive a DL signal, from among the upper-layer BS and the lower-layer BS, based on the first received signal strength and the second received signal strength.

8. The method of claim 1, wherein the determining of the UL TX power comprises:

calculating a third received signal strength of the upper-layer BS and a fourth received signal strength of the lower-layer BS according to a difference between a TX power of the upper-layer BS and a TX power of the lower-layer BS, based on the first received signal strength, the second received signal strength, and the TX power ratio; and determining the UL TX power based on the third received signal strength and the fourth received signal strength.

9. The method of claim 8, wherein if the UL serving BS is the upper-layer BS, the UL TX power is defined as, $$P_{TX\_Macro} = :L + NI + f\left(SIR_{DL\_Macro}^{UL\_PC}\right),$$

$$SIR_{DL\_Macro}^{UL\_PC} = \frac{SIR_{Macro\_to\_outercell}}{P_{Gap}SIR_{Pico\_to\_outercell} + 1}$$

where $P_{TX\_Macro}$ represents a UL TX power when the UL serving BS is the upper-layer BS, L represents a path loss, NI represents Noise and Interference (NI), $SIR_{DL\_Macro}^{UL\_PC}$ represents the third received signal strength of the upper-layer BS, $SIR_{Macro\_to\_outercell}$ represents a ratio of a signal from the upper-layer BS to interference from an outer BS in an outer cell, $SIR_{Pico\_to\_outercell}$ represents a ratio of a signal from the lower-layer BS to interference from the outer BS, $P_{Gap}$ represents the TX power ratio, and f( ) represents a value, which is determined differently for each MS.

10. The method of claim 8, wherein if the UL serving BS is the lower-layer BS, the UL TX power is defined as, $$P_{TX\_Pico} = :L + NI + f\left(SIR_{DL\_Pico}^{UL\_PC}\right),$$

$$SIR_{DL\_Pico}^{UL\_PC} = \frac{P_{Gap}SIR_{Pico\_to\_outercell}}{SIR_{Macro\_to\_outercell} + 1}$$

where $P_{TX\_Pico}$ represents a UL TX power when the UL serving BS is the lower-layer BS, L represents a path loss, NI represents Noise and Interference (NI), $SIR_{DL\_Pico}^{UL\_PC}$ represents the fourth received signal strength of the lower-layer BS, $SIR_{Macro\_to\_outercell}$ represents a ratio of a signal from the upper-layer BS to interference from an outer BS in an outer cell, $SIR_{Pico\_to\_outercell}$ represents a ratio of a signal from the lower-layer BS to interference from the outer BS, $P_{Gap}$ represents the TX power ratio, and f( )represents a value, which is determined differently for each MS.

11. A method for controlling an uplink (UL) power by a Base Station (BS) in a wireless communication system, the method comprising:
    transmitting a reference signal to a Mobile Station (MS);
    transmitting, to the MS, one of a transmission (TX) power of the BS and a TX power ratio representative of a ratio of a TX power of an upper-layer BS to a TX power of a lower-layer BS; and
    receiving a UL signal from the MS;
    wherein the BS is one of the upper-layer BS and the lower-layer BS whose cell coverage is narrower than that of the upper-layer BS; and
    wherein the UL TX power is determined based on a received signal strength of the reference signal and the TX power ratio.

12. The method of claim 11, wherein the reference signal includes one of a preamble signal, a midamble signal, and a pilot signal.

13. The method of claim 11, wherein the transmitting of the reference signal comprises:
    if the BS is the upper-layer BS, transmitting the reference signal to the MS in a frequency band different from a frequency band in which a reference signal of the lower-layer BS is transmitted, or transmitting the reference signal to the MS at a time different from a time at which the reference signal of the lower-layer BS is transmitted; and
    if the BS is the lower-layer BS, transmitting the reference signal to the MS in a frequency band different from a frequency band in which a reference signal of the upper-layer BS is transmitted, or transmitting the reference signal to the MS at a time different from a time at which the reference signal of the upper-layer BS is transmitted.

14. An apparatus for controlling an uplink (UL) power in a Mobile Station (MS) in a wireless communication system including an upper-layer Base Station (BS) and a lower-layer BS whose cell coverage is narrower than that of the upper-layer BS, the apparatus comprising:
    a receiver configured to receive a first reference signal from the upper-layer BS and receiving a second reference signal from the lower-layer BS;
    a memory configured to store a first received signal strength of the first reference signal, a second received signal strength of the second reference signal, and a transmission (TX) power ratio;
    a controller operable to:
        measure the first received signal strength and the second received signal strength;
        acquire the TX power ratio representative of a ratio of a first TX power of the upper-layer BS to a second TX power of the lower-layer BS;
        select a UL serving BS to which the MS will transmit a UL signal, from among the upper-layer BS and the lower-layer BS; and determine a UL TX power, based on the first received signal strength, the second received signal strength, and the TX power ratio; and
    a transmitter configured to transmit the UL signal to the UL serving BS using the UL TX power.

15. The apparatus method of claim 14, wherein each of the first and second reference signals includes one of a preamble signal, a midamble signal, and a pilot signal.

16. The apparatus of claim 14, wherein the first and second reference signals are received in different frequency bands or at different times.

17. The apparatus of claim 14, wherein the controller measures one of a Signal to Interference Ratio (SIR) and a Signal to Interference and Noise Ratio (SINR) for each of the first and second reference signals.

18. The apparatus of claim 14, wherein if the receiver receives the first TX power from the upper-layer BS and receives the second TX power from the lower-layer BS, the controller is operable to acquire the TX power ratio by calculating the TX power ratio based on the first TX power and the second TX power.

19. The apparatus of claim 14, wherein the TX power ratio is received from at least one of the upper-layer BS and the lower-layer BS.

20. The apparatus of claim 14, wherein the controller is operable to select a downlink (DL) serving BS from which the MS will receive a DL signal, based on the first received signal strength and the second received signal strength.

21. The apparatus of claim 14, wherein the controller is operable to:
    calculate a third received signal strength of the upper-layer BS and a fourth received signal strength of the lower-layer BS according to a difference between a TX power of the upper-layer BS and a TX power of the lower-layer BS, based on the first received signal strength, the second received signal strength, and the TX power ratio; and
    determine the UL TX power based on the third received signal strength and the fourth received signal strength.

22. The apparatus of claim 21, wherein if the UL serving BS is the upper-layer BS, the UL TX power is defined as, $$P_{TX\_Macro} = :L + NI + f\left(SIR_{DL\_Macro}^{UL\_PC}\right),$$

$$SIR_{DL\_Macro}^{UL\_PC} = \frac{SIR_{Marco\_to\_outercell}}{P_{Gap}SIR_{Pico\_to\_outecell} + 1}$$

where $P_{TX\_Macro}$ represents a UL TX power when the first serving BS is the upper-layer BS, L represents a path loss, NI represents Noise and Interference (NI), $SIR_{DL\_Macro}^{UL\_PC}$ represents the third received signal strength of the upper-layer BS, $SIR_{Macro\_to\_outercell}$ represents a ratio of a signal from the upper-layer BS to interference from an outer BS in an outer cell, $SIR_{Pico\_to\_outercell}$ represents a ratio of a signal from the lower-layer BS to interference from the outer BS, $P_{Gap}$ represents the TX power ratio, and f( ) represents a value, which is determined differently for each MS.

23. The apparatus of claim 21, wherein if the UL serving BS is the lower-layer BS, the UL TX power is defined as, $$P_{TX\_Pico} = :L + NI + f(SIR_{DL\_Pico}^{UL\_PC}),$$

$$SIR_{DL\_Pico}^{UL\_PC} = \frac{P_{Gap}SIR_{Pico\_to\_outercell}}{SIR_{Macro\_to\_outercell} + 1}$$

where $P_{TX\_Pico}$ represents a UL TX power when the UL serving BS is the lower-layer BS, L represents a path loss, NI represents Noise and Interference (NI), $SIR_{DL\_Pico}^{UL\_PC}$ represents the fourth received signal strength of the lower-layer BS, $SIR_{Macro\_to\_outercell}$ represents a ratio of a signal from the upper-layer BS to interference from an outer BS in an outer cell, $SIR_{Pico\_to\_outercell}$ represents a ratio of a signal from the lower-layer BS to interference from the outer BS, $P_{Gap}$ represents the TX power ratio, and f( )represents a value, which is determined differently for each MS.

24. An apparatus for controlling an uplink (UL) power in a Base Station (BS) in a wireless communication system, the apparatus comprising:

a transmitter configured to transmit a reference signal to a Mobile Station (MS), and transmit, to the MS, one of a transmission (TX) power of the BS and a TX power ratio representative of a ratio of a TX power of an upper-layer BS to a TX power of a lower-layer BS;

a memory configured to store the TX power of the BS and the TX power ratio; and a receiver configured to receive a UL signal that is transmitted from the MS using the UL TX power;

wherein the BS is one of the upper-layer BS and the lower-layer BS whose cell coverage is narrower than that of the upper-layer BS; and wherein the UL TX power is determined based on a received signal strength of the reference signal and the TX power ratio.

25. The apparatus of claim 24, wherein the reference signal includes one of a preamble signal, a midamble signal, and a pilot signal.

26. The apparatus of claim 24, wherein the transmitter is operable to:

if the BS is the upper-layer BS, transmit the reference signal to the MS in a frequency band different from a frequency band in which a reference signal of the lower-layer BS is transmitted, or transmitting the reference signal to the MS at a time different from a time at which the reference signal of the lower-layer BS is transmitted; and if the BS is the lower-layer BS, transmit the reference signal to the MS in a frequency band different from a frequency band in which a reference signal of the upper-layer BS is transmitted, or transmitting the reference signal to the MS at a time different from a time at which the reference signal of the upper-layer BS is transmitted.

* * * * *